United States Patent
Mori et al.

(10) Patent No.: US 7,060,779 B1
(45) Date of Patent: Jun. 13, 2006

(54) PROCESSES FOR PRODUCING HYDROCARBON/PHENOL RESIN AND PRODUCING EPOXY RESIN

(75) Inventors: Satoshi Mori, Yokohama (JP); Isoo Shimizu, Yokohama (JP)

(73) Assignee: Nippon Petrochemicals Company, Limited, Tokyo (JP)

( * ) Notice: Subject to any disclaimer, the term of this patent is extended or adjusted under 35 U.S.C. 154(b) by 0 days.

(21) Appl. No.: 09/720,623

(22) PCT Filed: Apr. 28, 2000

(86) PCT No.: PCT/JP00/02818

§ 371 (c)(1),
(2), (4) Date: Dec. 27, 2000

(87) PCT Pub. No.: WO00/66645

PCT Pub. Date: Nov. 9, 2000

(30) Foreign Application Priority Data

Apr. 30, 1999 (JP) .................. 11-123769

(51) Int. Cl.
*C08G 61/12* (2006.01)

(52) U.S. Cl. ........................... 528/87; 528/205

(58) Field of Classification Search ............ 528/97, 528/98, 205, 212; 568/718, 721
See application file for complete search history.

(56) References Cited

U.S. PATENT DOCUMENTS

| | | | |
|---|---|---|---|
| 4,927,905 A * | 5/1990 | Bogan | 528/205 |
| 5,336,752 A | 8/1994 | Oshimi et al. | |
| 5,344,899 A | 9/1994 | Enomoto et al. | |
| 5,368,977 A * | 11/1994 | Yoda et al. | 430/190 |
| 6,291,723 B1 * | 9/2001 | Gerber | 568/793 |

FOREIGN PATENT DOCUMENTS

| | | |
|---|---|---|
| JP | 4-300816 | 10/1992 |
| JP | 5-5022 | 1/1993 |
| JP | 7-252349 | 10/1995 |
| JP | 8-53539 | 2/1996 |
| JP | 11-49936 | 2/1999 |
| JP | 11-199657 | 7/1999 |
| JP | 11-199659 | 7/1999 |
| WO | WO 200035988 A1 * | 6/2000 |

OTHER PUBLICATIONS

Lee and Neville, Handbook of Epoxy Resins, pp. 2-4 and 2-5, Mar. 1967.
Kirk-Othmer, Encyclopedia of Chemical Technology, 4$^{th}$ ed., vol. 6, p. 847.
Cram and Hammond, Organic Chemistry, p. 350 (1959).

* cited by examiner

*Primary Examiner*—Marc S Zimmer
(74) *Attorney, Agent, or Firm*—Hollander Law Firm, P.L.C.

(57) ABSTRACT

A process for efficiently producing hydrocarbon/phenol resin having a satisfactory hue through reaction of phenol with an unsaturated cyclic hydrocarbon having two or more carbon—carbon double bonds in the presence of an acid catalyst, which comprises (1) a step in which the molar fraction of ether type reaction products to all the reaction products is regulated to at least 0.1 and (2) a step in which the ether type reaction products yielded by the progress of the reaction is substantially eliminated. The hydrocarbon/phenol resin thus obtained is reacted with an epihalohydrin in the presence of a base catalyst to obtain an epoxy resin having an excellent hue.

20 Claims, No Drawings

PROCESSES FOR PRODUCING HYDROCARBON/PHENOL RESIN AND PRODUCING EPOXY RESIN

This application is a 371 national stage application of international application PCT/JP00/02818 filed on Apr. 28, 2000, and claims priority of Japanese patent application JP 11-123769 filed on Apr. 30, 1999.

TECHNICAL FIELD

The present invention relates to a process for producing hydrocarbon-phenol resin such as dicyclopentadiene (DCPD)-phenol resin, which is excellent in moisture resistance, heat resistance and crack resistance and also good in hue. Furthermore, the invention relates to a process for producing epoxy resin that is produced from the above-obtained resin. The hydrocarbon-phenol resin is derived from unsaturated cyclic hydrocarbons having two or more carbon—carbon double bonds such as DCPD together with phenolic compound such as phenol.

More particularly, the invention relates to a process for producing phenol resin and epoxy resin, which is excellent in moisture resistance, heat resistance and crack resistance. So that, it is useful as an electrically insulating material, particularly as the resin for sealing or encapsulating semiconductors and for producing laminated materials. Furthermore, both the above resins excel in external appearance and in marking property owing to their satisfactory hue.

BACKGROUND ART

It has been known that the DCPD-phenol resin is produced by the catalytic reaction of phenolic compound and DCPD in the presence of an acid catalyst of Friedel-Crafts catalyst such as boron trifluoride complex or an ion exchange resin.

However, it has been a problem that the conventional DCPD-phenol resin is colored in dark brown so deeply that the external appearance of molded products is not agreeable and the epoxy resin obtained by reacting the above resin with epihalohydrin is colored in dark brown similarly. When the colored epoxy resin is used as a sealing material, it is difficult to apply marks to resin products, so that work efficiency is lowered seriously.

Therefore, in Japanese Laid-Open Patent Publication No. H07-252349, a method for obtaining light colored resins is proposed, in which DCPD is reacted with phenol using boron trifluoride catalyst at low temperatures for a long period of time. However, even when this method is utilized, the tendency of coloring in hydrocarbon-phenol resin is not always sufficiently reduced. Furthermore, because the reaction takes a long period of time as long as 20 hours or more in total, there is a problem that much labor is required resulting in the increase in production cost.

The primary object of the present invention is, therefore, to provide a process for producing effectively a hydrocarbon-phenol resin having desirable hue or color tone without necessitating a long period of time by reacting phenolic compound with unsaturated cyclic hydrocarbon having two or more carbon—carbon double bonds in the presence of an acid catalyst. Another object of the present invention is to provide a process for producing epoxy resin that is similarly less colored and excellent in color tone, which resin is made by reacting the above phenol resin with epihalohydrin in the presence of a base catalyst.

DISCLOSURE OF INVENTION

The present inventors have carried out extensive investigations in order to solve the above problems. As a result, they have found out the following fact in the process for producing phenol resin by reacting phenolic compound with unsaturated cyclic hydrocarbon in the presence of Friedel-Crafts acid catalyst. That is, the hydrocarbon-phenol resin having good color tone can be obtained effectively in a short time by optimizing the reaction conditions by observing ether-type by-product. As a result, the present invention has been accomplished.

Thus, a first aspect of the present invention relates to a process for producing hydrocarbon-phenol resin by the reaction of phenolic compound and unsaturated cyclic hydrocarbon having two or more carbon—carbon double bonds in the presence of acid catalyst, which process comprises the steps (1) and (2):
   step (1) to adjust the molar ratio of the amount of ether-type product relative to that of the whole product to 0.1 or more,
   step (2) to extinguish substantially the ether-type product obtained in the step (1) by proceeding with the above reaction.

A second aspect of the present invention relates to a process for producing hydrocarbon-phenol resin by the reaction of phenolic compound and unsaturated cyclic hydrocarbon having two or more carbon—carbon double bonds in the presence of an acid catalyst, which process comprises the steps (1) and (2),
   step (1) to carry out the reaction in the range of 50° C. to 90° C. or, if the melting point of phenolic compound is higher than 50° C., in the range from the melting point of phenolic compound to 90° C., while adding unsaturated cyclic hydrocarbon having two or more carbon—carbon double bonds to the phenolic compound intermittently or continuously,
   step (2), after the addition of unsaturated cyclic hydrocarbon, to increase the temperature to 110° C. or higher so as to continue the reaction further.

A third aspect of the present invention relates to a process for producing hydrocarbon-phenol resin as described in the first or second aspect, wherein the ratio of ortho-type/para-type is 2.0 or more in regard to the substitution position of unsaturated cyclic hydrocarbon relative to hydroxyl group of phenolic compound in the hydrocarbon-phenol resin.

A fourth aspect of the present invention relates to a process for producing hydrocarbon-phenol resin as described in the first or second aspect, which process comprises deactivating catalyst after the reaction and then, recovering unreacted phenolic compound.

A fifth aspect of the present invention relates to a process for producing hydrocarbon-phenol resin as described in the first or second aspect, wherein the phenolic compound is phenol and unsaturated cyclic hydrocarbon having two or more carbon—carbon double bonds is dicyclopentadiene.

A sixth aspect of the present invention relates to a process for producing epoxy resin, which process comprises the step of reacting the hydrocarbon-phenol resin obtained by the process as described in the first or second aspect, with epihalohydrin in the presence of a base catalyst, then removing residual catalyst and further removing unreacted epihalohydrin.

According to the present invention, hydrocarbon-phenol resin having good color tone such as DCPD-phenol resin can be obtained by a reaction in a short time effectively.

Furthermore, glycidyl groups are introduced into the above-obtained hydrocarbon-phenol resin in the presence of base catalyst. Then, after residual catalyst is removed and unreacted epihalohydrin is distilled off, epoxy resin is obtained, which is excellent in curing property and also in color tone.

In the following, the present invention will be described in more detail.

The process for producing hydrocarbon-phenol resin according to the present invention is as follows.

Phenolic compound and unsaturated hydrocarbon having two or more carbon—carbon double bonds are caused to react in the presence of acid catalyst.

Unsaturated cyclic hydrocarbon having two or more carbon—carbon double bonds used as a starting material of hydrocarbon-phenol resin according to the present invention may be a cyclic hydrocarbon having bridged structure. The number of carbon—carbon double bonds may be 2 or more per molecule and preferably 4 or less.

Specific unsaturated cyclic hydrocarbons having two or more carbon—carbon double bonds are exemplified by dicyclopentadiene, 4-vinylcyclohexene, 5-vinylnorborna-2-ene, 3a,4,7,7α-tetrahydroindene, α-pinene, and limonene. These compounds can also be used as a mixture. Dicyclopentadiene is particularly favorable, because the obtained resin is excellent in thermal resistance, moisture resistance and mechanical characteristics.

Further, the phenolic compounds used in the present invention are defined as hydroxyl group-containing aromatic compounds. They are not particularly limited as long as they are aromatic compounds having at least one hydroxyl group directly connected to aromatic ring. As the aromatic rings, benzene ring and condensed ring such as naphthalene are exemplified.

Therefore, as specific examples of phenolic compounds used according to the present invention, there are monohydric phenols such as phenol, o-cresol, m-cresol, p-cresol, o-ethylphenol, m-ethylphenol, p-ethylphenol, o-propylphenol, m-propylphenol, p-propylphenol, p-sec-butylphenol, p-tert-butylphenol, p-cyclo-hexylphenol, p-chlorophenol, o-bromophenol, m-bromophenol, p-bromophenol, α-naphthol and β-naphthol; dihydric phenols such as resorcin, catechol, hydroquinone, 2,2-bis(4'-hydroxyphenyl)propane, bis(hydroxyphenyl)methane, bis(hydroxynaphthyl)methane, tetramethylbiphenol and biphenol; trihydric phenols such as tris(hydroxyphenyl)methane, and the mixtures of them. Among them, phenol, o-cresol, m-cresol, α-naphthol, β-naphthol and 2,2-bis(4'-hydroxy-phenyl)propane are particularly desirable because they are economically efficient and easy to produce. These can also be used as a mixture.

The mixing ratio of unsaturated cyclic hydrocarbon and phenolic compound in reaction can be selected optionally depending on the molecular weight and melt viscosity of an intended hydrocarbon-phenol resin. However, it is usually preferable that the molar ratio of phenolic compound/unsaturated cyclic hydrocarbon is in the range of 1 to 20. In order to reduce the melt viscosity of the obtained resin in particular, the molar ratio of phenolic compound/unsaturated cyclic hydrocarbon is preferably in the range of 5 to 15. When epoxidation is carried out by using hydrocarbon-phenol resin having low melt viscosity, an epoxy resin having similarly low melt viscosity is obtained. Both of the resins can be filled with large quantities of fillers in the use for sealing or encapsulating semiconductors, so that they have preferably low coefficients of linear expansion and high water resisting property. When catalyst is used in a small quantity, the molar ratio of phenolic compound/unsaturated cyclic hydrocarbon of 7 to 10 is preferable.

As catalysts used for producing hydrocarbon-phenol resin, Friedel-Crafts catalysts can be exemplified, particularly those having good activities and easiness of removing. That is, they are boron trifluoride and their complex catalysts such as boron trifluoride-ether complex, boron trifluoride-phenol complex, boron trifluoride-water complex, boron trifluoride-alcohol complex, boron trifluoride-amine complex, and mixtures of these. Among all these, boron trifluoride, boron trifluoride-phenol complex and boron trifluoride-ether complex are desirable.

In the first aspect of the present invention, a concentration of catalyst can be usually selected from the range of 0.001 to 10% by mass as the concentration in a reaction system.

In producing hydrocarbon-phenol resin, solvents can be used, and they are not particularly limited as long as they do not hinder the reaction. As favorable solvents, there are aromatic hydrocarbon compounds such as benzene, toluene and xylene.

The amount of solvent to be used is preferably 20 to 300 parts by mass relative to 100 parts by mass of the above phenolic compound. When phenolic compound is used in excess relative to unsaturated cyclic hydrocarbon, the other solvent is not necessary.

In the first aspect of the present invention, the reaction temperature can be usually selected from the range of the melting point of phenolic compound to 200° C., and the retention time of reaction can be selected from the range of 10 minutes to 100 hours.

When phenolic compound and unsaturated cyclic hydrocarbon are caused to react to produce hydrocarbon-phenol resin, ether-type product may be sometimes produced as by-product besides hydrocarbon-phenol resin. This ether-type product is formed because unsaturated cyclic hydrocarbon is added to phenolic hydroxyl group of phenolic compound and the hydroxyl group is converted into ether linkage, therefore, its formation is unfavorable.

Accordingly, methods of suppressing the formation of ether-type product as much as possible are usually investigated. However, according to the present invention, a method is adopted, which produces this product positively in a certain amount or more. As the result of using this method, it is possible to produce the resin in good efficiency in a short time effectively, and besides, the resin having good color tone can be obtained.

That is, in the step (1) of the first aspect of the present invention, phenolic compound and unsaturated cyclic hydrocarbon having two or more carbon—carbon double bonds are caused to react so that the molar fraction of the amount of ether-type product relative to that of the whole product can be 0.1 or more. Depending on the adding order of respective starting materials, reaction condition and so forth, the molar fraction of the amount of ether-type product relative to that of the whole product may be 0.1 or more. However, according to the present invention, the adjustment is carried out so that the molar fraction of the amount of ether-type product can be 0.1 or more at the time when phenolic compound, unsaturated cyclic hydrocarbon or both of them almost finish reaction.

As mentioned above, it is essential to cause phenolic compound and unsaturated cyclic hydrocarbon having two or more carbon—carbon double bonds to react so that the molar fraction of the amount of ether-type product relative to that of the whole product may be 0.1 or more. If the molar fraction of the amount of ether-type product is less than 0.1, the color tone of the obtained resin is reduced unfavorably.

The upper limit of the molar fraction of the amount of the ether-type product relative to that of the whole product is not set particularly. However, if the amount of ether-type product is too much, the yield of the intended hydrocarbon-phenol resin is reduced, and besides, the next step (2) to extinguish ether-type product is overloaded. Therefore, the upper limit of 0.5 is usually suitable.

In order to adjust the ratio of ether-type product, reaction temperature, retention time of reaction, catalyst concentration and the like are selected appropriately. In addition, water content in a reaction system gives some influences. So that these factors are adjusted appropriately to carry out the reaction. According to the present invention, when conditions, such as reaction temperature, retention time of reaction and catalyst concentration, should be changed depending on the alterations of apparatus, starting materials and so forth, they can be also set easily by using the amount ratio of ether-type product as an index.

The content of ether-type product is measured using $^{13}$C-NMR. In measuring with $^{13}$C-NMR, $CDCl_3$ is used as a solvent. NNE method (decoupling method by nuclear Overhauser effect) is used, and the content of ether-type product can be obtained as the value of integrated intensity of chemical shift of 155 to 160 ppm divided by the total of each integrated intensity of chemical shift of 130 to 133 ppm, 137 to 140 ppm and 155 to 160 ppm. Resonance frequency of $^{13}$C-NMR can be set, for example, at 400 MHz.

Then, in the step (2) of the present invention, the ether-type product is vanished substantially by continuing the reaction further. Usually, after phenolic compound, unsaturated cyclic hydrocarbon or both of them almost finish the reaction, ether-type product can be vanished substantially, by continuing heating and stirring in the presence of an acid catalyst in the above ranges of reaction temperature and retention time of reaction. Usually, the temperature by 20° C. or more, preferably 30° C. or more, higher than that of the step (1) is used. In the step (1), where ether-type product is produced positively, reaction proceeds relatively fast. In the step (2), where the reaction is carried out preferably in a relatively high temperature, reaction proceeds also fast. As a result, total retention time from the beginning is so short that hydrocarbon-phenol resin having good color tone can be produced in a short time effectively. Usually, it is possible to produce a resin having good color tone in a short time of total 10 hours from the beginning of reaction.

At this point, the preferable conditions for producing hydrocarbon-phenol resin are as follows, as described in the second aspect of the present invention. That is, (1) the reaction is carried out in the range of temperature from any higher of the melting point of phenolic compound or 50° C. to 90° C. in the presence of acid catalyst, while adding unsaturated cyclic hydrocarbon having two or more carbon—carbon double bonds to the phenolic compound intermittently or continuously, then (2) the temperature is increased to 110° C. or higher to continue the reaction further.

That is, in the step (1) where unsaturated cyclic hydrocarbon is added to phenolic compound intermittently or continuously, the reaction is carried out in the range of temperature from any higher of the melting point of phenolic compound or 50° C. to 90° C. If the reaction temperature is higher than 90° C., unsaturated cyclic hydrocarbon such as DCPD is liable to be decomposed, besides, the color tone of resin deteriorates unfavorably. Though the retention time of the step (1) is not especially limited, it can be usually selected from the range of 10 minutes to 60 hours appropriately.

In the range of reaction temperature of the above the step (1), phenolic compound, unsaturated cyclic hydrocarbon or both of these starting materials are caused to finish the reaction. Usually, because phenolic compound exists in excess, substantially the whole of unsaturated cyclic hydrocarbon is caused to react in the range of the above reaction temperature.

With the above-mentioned method, it is possible to react phenolic compound with unsaturated cyclic hydrocarbon having two or more carbon—carbon double bonds so that the molar fraction of the amount of ether-type product relative to that of the whole product can be 0.1 or more.

Next, the reaction is continued further in the step (2) to extinguish substantially the ether-type product once obtained in the above step. For this purpose, it is essential to increase the reaction temperature above that of the step (1), specifically 110° C. or higher, preferably in the range of 120 to 170° C. When the reaction is carried out particularly in the range of 140 to 150° C., hydrocarbon-phenol resin having good color tone can be obtained in a short time effectively. If the temperature of the step (2) is lower than 110° C., it takes a long time to extinguish substantially the ether-type product once obtained, which is economically unfavorable. If the temperature is higher than 170° C., the color tone of the obtained resin deteriorates, and decomposition of catalyst or side reaction is liable to occur. Therefore, the temperature is preferably set at 170° C. or lower.

The ether-type product produced in the step (1) is a by-product as mentioned above, therefore, it is desirable to decrease the amount finally as small as possible. Usually, the reaction is continued until the molar fraction of the amount of ether-type product relative to that of the whole product reaches 0.05 or less, preferably 0.02 or less. Though the retention time is not limited, it is usually possible to extinguish substantially the ether-type product once produced in the reaction of 1 to 5 hours, particularly 2 to 3 hours.

According to the present invention, it is possible to produce a resin having a good color tone in a total retention time of reaction of the above two steps as short as 10 hours.

In producing a hydrocarbon-phenol resin according to the present invention, the concentration of catalyst in a reaction system affects the reaction path and the substitution position of unsaturated cyclic hydrocarbons. Therefore, it is favorable to adjust the concentration to 1.00% by mass or less, preferably in the range of 0.05 to 1.00% by mass relative to the total mass of phenolic compound, unsaturated cyclic hydrocarbons and catalyst. Specifically, when boron trifluoride-phenol complex is used as acid catalyst for reaction of phenol and dicyclopentadiene, the catalyst is added in 1.00% by mass or less relative to the total mass of phenol, dicyclopentadiene and catalyst. If the amount of catalyst exceeds this value, deterioration of the color tone of resin is accelerated and decomposition of the resin occurs, which are both unpreferable.

Though the amount of moisture in a reaction system is not particularly limited, the progress of reaction can be controlled accurately in a favorable manner, by maintaining the concentration of moisture at 200 ppm or less, preferably 100 ppm or less. Phenolic compounds are liable to absorb moisture owing to their polar groups. Exemplified as a method for dehydration is, for example, formation of azeotropic mixture of phenolic compound with organic solvents under $N_2$ flow. However, a reaction system absorbs moisture actually sometimes in a process of dehydration, therefore, sufficient care is needed for dehydration. In any case, it is necessary to collect samples from the system and confirm the amount of moisture. Further, it is necessary to dehydrate unsaturated cyclic hydrocarbon and the like before use by conventional procedure.

During a reaction period, usually gas in a reaction vessel is replaced by an inert gas, and it is preferable to use an airtight system. When an open system is used for reaction, reaction can be conducted while an inert gas is supplied to a reaction vessel. As inert gases to be used herein, nitrogen, argon and the like are exemplified.

It is essential to adjust the amount of moisture in a reaction system to 100 ppm or less as mentioned above.

In a process for producing hydrocarbon-phenol resin of the present invention, definite reaction procedures are not specified as long as phenolic compound and unsaturated cyclic hydrocarbon are caused to react under the conditions as above. For example, the following method is used.

That is, phenolic compound, if necessary, with a prescribed organic solvent, is supplied to a reaction vessel, then heated to remove the organic solvent and moisture as an azeotropic mixture. It is confirmed that the amount of moisture in the reaction system attains to a prescribed value. For this confirmation, usually the liquid is taken out of the system and measured. After that, a prescribed amount of acid catalyst is added in the system, then unsaturated cyclic hydrocarbon is added dropwise. Because it is also necessary to adjust the amount of moisture of unsaturated cyclic hydrocarbon, it is preferable to measure the amount of moisture previously and carry out dehydration according to the conventional procedure.

According to the present invention, after the hydrocarbon-phenol resin is produced by the method as mentioned above, the catalyst is deactivated to terminate the reaction surely. If the reaction mixture is heated without deactivating catalysts, the reaction continues further and causes unfavorable situation in some cases.

Though procedure for deactivation is not especially limited, it is favorable to use the procedure in which the amount of the residual ionic impurity, such as boron and fluorine, in a final hydrocarbon-phenol resin is 100 ppm or less. For this purpose, it is preferable to use deactivating agent. Exemplified as deactivating agents are alkali metals, alkaline earth metals, and their oxides, hydroxides and carbonates, and inorganic bases such as ammonium hydroxide and ammonia gas, and besides hydrotalcites. Because hydrotalcites can also adsorb even ionic impurities, the treatment is simple and prompt, and moreover, the amount of residual ionic impurity after treatment is small. Therefore, hydrotalcites are especially suitable for the purpose of deactivating catalysts by treating the reaction liquid.

After acid catalyst is deactivated with and adsorbed by hydrotalcite or the like, the hydrotalcite having acid catalyst adsorbed is filtered off to recover the reaction liquid that does not substantially contain the residue of catalyst. Then, the reaction liquid can be condensed by distillation to obtain a hydrocarbon-phenol resin of high purity. In carrying out filtration, operating efficiency can be improved by adding solvents or carrying out heat treatment.

In the present invention, the intended hydrocarbon-phenol resin can be obtained by concentrating the filtrate obtained according to the above method to recover unreacted phenolic compound.

By using the above method of the present invention, it is possible to maintain the ratio of ortho-type/para-type of 2.0 or more in regard to the substitution position of unsaturated cyclic hydrocarbon relative to hydroxyl group of phenol in the hydrocarbon-phenol resin. As a result, it is possible to obtain a hydrocarbon-phenol resin being excellent in balance of resin properties such as color tone and curing property.

The measurement of the above ratio of ortho-type/para-type (O/P ratio) is carried out by $^{13}$C-NMR. In this measurement, $CDCl_3$ is used as a solvent, NNE method (decoupling method by nuclear Overhauser effect) is used, and the ratio is given as the value of integrated intensity of chemical shift of 130 to 133 ppm divided by the integrated intensity of chemical shift of 137 to 140 ppm. The resonance frequency can be set, for example, at 400 MHz.

The conventionally employed method using Gardner standard solution according to JIS K 5400 is a method for testing color tone of solutions. In the evaluation of color tone of the resin obtained according to the present invention, however, the results are not always consistent with the color tone of actual solid resin. In addition, because the measurement is done on the basis of comparison with standard color solutions, the standards and results of evaluation differ with test persons.

On the contrary, with the method using absorptiometry in the region of visible rays and ultraviolet rays, variation among results is small and the correlation between measured value and actual color tone is high. Therefore, the latter absorptiometry was adopted for the color tone estimation in the present invention. The method will be explained in the following.

In this method, diluted solutions are used, which contain resins dissolved in arbitrary solvents. Suitable diluting solvents have small absorption over the whole region of visible rays and ultraviolet rays. Accordingly, aliphatic saturated hydrocarbon, aliphatic saturated hydrocarbon ether or the like is used preferably. However, dioxane and tetrahydrofuran are particularly favorable because of their large solvent power for resins. The absorbance of solution is measured at wavelength 350 nm and the color tone is estimated with this result. The present resin having good color tone has the most remarkable characteristic in the absorbance at wavelength 350 nm. That is, the resins that have an absorbance of 1.0 or lower are good in actual color tone, and are useful as a raw material for producing epoxy resin in the subsequent reaction.

The hydrocarbon-phenol resins obtained as above are used as raw material for epoxy resins, and also useful as curing agent of epoxy resin for electrically insulating materials, especially materials for sealing semiconductor or materials for laminated plates. The molded products are good in external appearance and in marking property because of their excellent color tone. However, the use is not particularly limited to the above.

In the following, a method for producing epoxy resin excellent in color tone by using the above hydrocarbon-phenol resin as raw material will be described.

The present epoxy resin having good color tone can be obtained by reacting the hydrocarbon-phenol resin obtained as above with an epihalohydrin in the presence of base catalyst to introduce glycidyl group. The reaction of introducing glycidyl group is carried out by the conventional procedure. Definitely, for instance, the above hydrocarbon-phenol resin is reacted with a glycidyl group-containing agent such as epichlorohydrin or epibromohydrin in the presence of base such as sodium hydroxide or potassium hydroxide, usually at 10 to 150° C., preferably at 30 to 80° C. Then, the reaction product is washed with water and dried to give an epoxy resin.

Here, the amount of glycidyl group-containing agent is preferably 2 to 20 times, preferably 3 to 7 times, the molar equivalent of hydrocarbon-phenol resin. During the reaction period, the progress of reaction can be accelerated by removing water by azeotropic distillation of the glycidyl group-containing agent and water under reduced pressure.

When the present epoxy resin is used in a field of electronic parts, sodium chloride produced as a by-product in introducing glycidyl group must be removed completely in the water washing step. At this time, after glycidyl group-introducing agents are recovered by distillation to concentrate the reaction solution, the concentrated product may be dissolved in a solvent and washed with water. As the solvents, methyl isobutyl ketone, cyclohexanone, benzene, butyl cellosolve and or the like are preferable. Epoxy resin can be obtained by concentrating with heating the washed concentrate.

The epoxy equivalent (number of grams of resin containing 1 gram equivalent of epoxy group) of the above epoxy resin is usually 200 to 500, preferably 250 to 450. If epoxy equivalent exceeds 500, cross-linking density decreases unfavorably.

The epoxy resins obtained as above are superior to the epoxy resins obtained from the conventional hydrocarbon-phenol resin, in color tone, external appearance and marking property of molded products. The epoxy resins having absorbance of 0.8 or lower measured by the above method are preferable in actual color tone.

Moreover, the obtained epoxy resin contains only a very small amount of monofunctional compounds of usually 0.5% by mass or less, more often 0.1% by mass or less. Accordingly, its curing property is also good.

Because the above epoxy resins are excellent in color tone, external appearance and marking property of molded products are good. Therefore, they are useful as epoxy resin composition materials for electrically insulating materials, especially materials for sealing or encapsulating semiconductors and materials for laminated plates. However, their uses are not limited only to these, but they are also used for powdery paint, brake shoes and so forth.

BEST METHOD FOR CARRYING OUT THE INVENTION

In the following, the present invention will be described in more detail with reference to examples and comparative examples.

Characteristics of hydrocarbon-phenol resins used in the following examples and comparative examples were measured according to the following methods.

(1) Substitution Ratio of Ortho-Type/Para-Type (O/P ratio)

The measurement was carried out by $^{13}$C-NMR (Fourier transform nuclear magnetic resonance, trade name: JNM-400, made by JEOL Ltd. (Nihon Denshi K.K.; resonance frequency: 400 MHz) using a solution of hydrocarbon-phenol resin of 10% by mass in $CDCl_3$.

O/P ratio can be obtained by the following equation, when $A_1$ is defined as an integrated intensity corresponding to the chemical shift of 130 to 133 ppm and $A_2$ is defined as that corresponding to the chemical shift of 137 to 140 ppm.

$$O/P \text{ ratio} = A_1/A_2$$

(2) Content of Ether-Type Product

The measurement was carried out by $^{13}$C-NMR (Fourier transform nuclear magnetic resonance apparatus, trade name: JNM-400, produced by JEOL Ltd. (Nihon Denshi K.K.) using a solution of hydrocarbon-phenol resin of 10% by mass in $CDCl_3$.

The content of ether-type product (molar fraction) can be obtained by the following equation, when $A_1$, $A_2$ and $A_3$ are defined as an integrated intensity corresponding to the chemical shift of 130 to 133 ppm, of 137 to 140 ppm and of 155 to 160 ppm respectively.

$$\text{Content of ether-type product} = A_3/(A_1+A_2+A_3)$$

(3) Absorbance of Ultraviolet and Visible Ray

A solution of hydrocarbon-phenol resin of 2% by mass in dioxane was measured according to the following method.

Analyzer: ultraviolet-visible ray spectrophotometer (trade name: Ubest-50, made by Jasco Corp.)

Measuring cell: made of quartz, optical path length 10 mm×optical path width 4 mm (4) Gardner Color Number Using a solution of hydrocarbon-phenol resin of 50% in dioxane, Gardner color number was determined in comparison with the Gardner standard solution according to JIS K 5400.

(5) Content of Monofunctional Compound in Epoxy Resin

The content was determined by gel permeation chromatography (hereinafter abbreviated as "GPC") using Chromatography Manager Millennium 2000 and a differential refraction-type spectrophotometer (trade name: WATERS 410).

EXAMPLE 1

(Production of Hydrocarbon-Phenol Resin-1)

Phenol and toluene were put into a reaction vessel and heated to 160° C., so that toluene was caused to form an azeotropic mixture with water and at the same time toluene was distilled away. The amount of phenol inside the reaction system after dehydrating was 750 g. With sampling appropriately, moisture of phenol in the system was confirmed to be 100 ppm or less. Then, 2.3 g of boron trifluoride-phenol complex was added in the system. After the mixture was homogenized, 150 g of dicyclopentadiene was added dropwise slowly in an hour while the liquid temperature was kept 70° C. After the end of dropping, the liquid was heated up to 140° C. and stirred further for 3 hours.

The content of ether-type product just after the end of dropping was measured and found to be 0.43.

The moisture contents of dicyclopentadiene and others were measured separately and confirmed to be 100 ppm or less. Further, the amount of moisture in the reaction system was measured appropriately, and was confirmed to be 100 ppm or less.

After the reaction was over, stirring was stopped and the reaction liquid was cooled to 70° C. Then, 5.5 g of hydrotalcite (trade name: Kyowaad 1000, made by Kyowa Chemical Industry Co., Ltd.) was added to deactivate catalysts, then the reaction liquid was filtered. The obtained filtrate was concentrated by vacuum distillation to obtain 326 g of hydrocarbon-phenol resin.

The softening point of the obtained hydrocarbon-phenol resin was 93.0° C., and the phenolic hydroxyl equivalent (number of grams of resin containing 1 gram equivalent of hydroxyl group) was 170.

The 0/P ratio measured by $^{13}$C-NMR was 2.7, and the content of ether-type product was 0.01 or less.

As the result of measuring the absorbance of a resin solution, the absorbance at wavelength 350 nm was 0.983, and the Gardner color number was 16 to 17.

The results are shown in Table 1.

EXAMPLE 2

(Production of Epoxy Resin-1)

In a four neck flask having capacity of 3 liter equipped with stirrer, refluxing condenser and thermometer were put 170 g of the hydrocarbon-phenol resin produced according to the procedure described in Example 1 and 400 g of epichlorohydrin, then they were dissolved and stirred. The reaction system was adjusted to pressure of 150 mmHg (200 hPa) and heated up to 68° C. Into this system was added continuously 100 g of an aqueous solution of sodium hydroxide having the concentration of 48% by mass, while a reaction was carried out for 3.5 hours. The water produced by reaction and that contained in the aqueous solution of sodium hydroxide were removed continuously from the reaction system by refluxing the azeotropic mixture of water-epichlorohydrin. After the end of reaction, the pressure of the reaction system was set back to atmospheric pressure, and the temperature was increased to 110° C. to remove the water in the reaction system completely. Excess epichlorohydrin was distilled away under atmospheric pressure, and further, distillation was carried out under reduced pressure of 15 mmHg (20 hPa) at 140° C.

To the obtained mixture of resin and sodium chloride were added 300 g of methyl isobutyl ketone and 36 g of an aqueous solution of sodium hydroxide of 10% by mass, and a reaction was carried out for 1.5 hours at 85° C. After the reaction was over, 750 g of methyl isobutyl ketone and 300 g of water were added, then the lower layer of aqueous solution of sodium chloride was removed by separation. Next, the layer of methyl isobutyl ketone was washed with 150 g of water and neutralized with phosphoric acid, and the water layer was removed. Further, 800 g of water was added for washing, and the water layer was removed. The separation of oil layer and water layer was satisfactory, and inorganic salts were recovered quantitatively. The layer of methyl isobutyl ketone was distilled under atmospheric pressure, then vacuum distillation was carried out successively under the pressure of 5 mmHg (6.7 hPa) at 140° C. to obtain 220 g of epoxy resin. Th epoxy equivalent of the epoxy resin was 261. The content of monofunctional compounds measured with GPC was 0.1% by mass or less.

Further, as the result of measuring the absorbance of a 2% dioxane solution of the resin, the absorbance at wavelength 350 nm was 0.741, and the Gardner color number was 14 to 15.

The results are shown in Table 1.

EXAMPLE 3

(Production of Hydrocarbon-Phenol Resin-2)

Phenol and toluene were put into a reaction vessel, and azeotropic dehydration was carried out in the manner similar to that of Example 1. The amount of phenol after dehydration was 780 g. Then, 1.7 g of boron trifluoride-phenol complex was added, and 120 g of dicyclopentadiene was added dropwise, further, procedures similar to those of Example 1 were carried out.

The content of ether-type product just after the end of dropping was measured and found to be 0.31.

The moisture contents of dicyclopentadiene and others were measured separately and confirmed to be 100 ppm or less. Further, the amount of moisture in the reaction system was measured appropriately, and was confirmed to be 100 ppm or less.

After the reaction, stirring was stopped and the reaction liquid was cooled to 70° C. Then, 4.0 g of hydrotalcite was added to deactivate catalysts and the reaction liquid was filtered. The obtained filtrate was concentrated by vacuum distillation to obtain 258 g of hydrocarbon-phenol resin.

The softening point of this hydrocarbon-phenol resin was 90.0° C., and the hydroxyl equivalent was found to be 169 as the result of measurement. The P/O ratio measured by $^{1}$C-NMR was 2.6, and the content of ether-type product was 0.01 or less.

Further, as the result of measuring the absorbance at wavelength 350 nm of a 2% dioxane solution of the resin, it was 0.851, and the Gardner color number was 13 to 14.

The results are shown in Table 1.

EXAMPLE 4

(Production of Epoxy Resin-2)

Procedures similar to those of Example 2 were conducted except that 169 g of the hydrocarbon-phenol resin synthesized in Example 3 was used, and 182 g of epoxy resin was obtained. The epoxy equivalent of the epoxy resin was 256. The content of monofunctional compounds measured with GPC was 0.1% by mass or less.

Further, as the result of measuring the absorbance of the resin, the absorbance at wavelength 350 nm was 0.710, and the Gardner color number was 11 to 12.

The results are shown in Table 1.

COMPARATIVE EXAMPLE 1

(Production of Hydrocarbon-Phenol Resin-3)

Phenol and toluene were put into a reaction vessel and heated to 160° C., so that toluene was caused to form an azeotropic mixture with water and at the same time toluene was distilled away. The amount of phenol inside the reaction system after dehydrating was 750 g. With sampling appropriately, moisture of phenol in the system was confirmed to be 100 ppm or less. Then, 9.0 g (0.99%) of boron trifluoride-phenol complex was added in the system. After the mixture was homogenized, 150 g of dicyclopentadiene was added dropwise slowly in an hour while the liquid temperature was kept 70° C. After the end of dropping, the liquid was heated up to 140° C. and stirred further for 3 hours.

The content of ether-type product just after the end of dropping was measured and found to be 0.03.

The moistures of dicyclopentadiene and others were measured separately and confirmed to be 100 ppm or less. Further, the amount of moisture in the reaction system was measured appropriately, and was confirmed to be 100 ppm or less.

After the reaction was over, stirring was stopped and the reaction liquid was heated to 210° C. Unreacted phenol was recovered by concentrating the liquid with vacuum distillation, and at the same time the reaction was terminated to obtain 319 g of hydrocarbon-phenol resin.

The softening point of the obtained hydrocarbon-phenol resin was 87.0° C., and the phenolic hydroxyl equivalent was 178.

The O/P ratio measured by $^{13}$-NMR was 1.3, and the content of ether-type product was 0.02.

As the result of measuring the absorbance of a resin solution, the absorbance at wavelength 350 nm was 1.873, and the Gardner color number was 18 or more.

The results are shown in Table 1.

COMPARATIVE EXAMPLE 2

(Production of Epoxy Resin-3)

In a four neck flask having capacity of 3 liter equipped with stirrer, refluxing condenser and thermometer were put 178 g of the hydrocarbon-phenol resin produced according to the procedure described in Comparative Example 1 and 400 g of epichlorohydrin, then they were dissolved and stirred. The reaction system was adjusted to pressure of 200 hPa and heated up to 68° C. Into this system added continuously 100 g of an aqueous solution of sodium hydroxide having the concentration of 48% by mass, while a reaction was carried out for 3.5 hours. The water produced by reaction and that contained in the aqueous solution of sodium hydroxide were removed continuously from the reaction system by refluxing the azeotropic mixture of water-epichlorohydrin. After the end of reaction, the pressure of the reaction system was set back to atmospheric pressure, and the temperature was increased to 110° C. to remove the water in the reaction system completely. Excess epichlorohydrin was distilled away under atmospheric pressure, and further, distillation was carried out under reduced pressure of 20 hPa at 140° C.

To the obtained mixture of resin and sodium chloride were added 300 g of methyl isobutyl ketone and 36 g of an aqueous solution of sodium hydroxide of 10% by mass, and a reaction was carried out for 1.5 hours at 85° C. After the reaction was over, 750 g of methyl isobutyl ketone and 300 g of water were added, then the lower layer of aqueous solution of sodium chloride was removed by separation. Next, the layer of methyl isobutyl ketone was washed with 150 g of water and neutralized with phosphoric acid, and the water layer was removed. Further, 800 g of water was added for washing, and the water layer was removed. The separation of oil layer and water layer was satisfactory, and inorganic salts were recovered quantitatively. The layer of methyl isobutyl ketone was distilled under atmospheric pressure, then vacuum distillation was carried out successively under the pressure of 6.7 hPa at 140° C. to obtain 220 g of epoxy resin. Th epoxy equivalent of the epoxy resin was 280. The content of monofunctional compounds measured with GPC was 0.6% by mass.

Further, as the result of measuring the absorbance of a 2% dioxane solution of the resin, the absorbance at wavelength 350 nm was 1.793, and the Gardner color number was 18 or more.

The results are shown in Table 1.

COMPARATIVE EXAMPLE 3

(Production of Hydrocarbon-Phenol Resin-4)

Phenol and toluene were put into a reaction vessel and heated to 160° C., so that toluene was caused to form an azeotropic mixture with water and at the same time toluene was distilled away. The amount of phenol inside the reaction system after dehydration was 750 g. Then, 5.6 g of 98% sulfuric acid was added in the system. After the mixture was homogenized, 150 g of dicyclopentadiene was added dropwise slowly in an hour while the liquid temperature was kept 90 to 100° C. After the end of dropping, the liquid was heated up to 110° C. and stirred further for 3 hours.

The content of ether-type product just after the end of dropping was measured and found to be 0.04.

After the reaction was over, stirring was stopped and 32 g of hydrotalcite (trade name: Kyowaad 1000) was added. After stirring for 30 minutes to deactivate catalyst, the reaction liquid was filtered. The obtained filtrate was concentrated by vacuum distillation to obtain 321 g of hydrocarbon-phenol resin.

The softening point of the obtained hydrocarbon-phenol resin was 96.0° C., and the phenolic hydroxyl equivalent was 169.

The O/P ratio measured by $^{13}$C-NMR was 1.3, and the content of ether-type product was 0.02.

As the result of measuring the absorbance of a resin solution, the absorbance at wavelength 350 nm was 1.648, and the Gardner color number was 18 or more.

The results are shown in Table 1.

COMPARATIVE EXAMPLE 4

(Production of Epoxy Resin-4)

In a four neck flask having capacity of 3 liter equipped with stirrer, refluxing condenser and thermometer were put 169 g of the hydrocarbon-phenol resin produced according to the procedure described in Comparative Example 3 and 400 g of epichlorohydrin, then they were dissolved and stirred. The reaction system was adjusted to pressure of 200 hPa and heated up to 68° C. Into this system was added continuously 100 g of an aqueous solution of sodium hydroxide having the concentration of 48% by mass, while a reaction was carried out for 3.5 hours. The water produced by reaction and that contained in the aqueous solution of sodium hydroxide were removed continuously from the reaction system by refluxing the azeotropic mixture of water-epichlorohydrin. After the end of reaction, the pressure of the reaction system was set back to atmospheric pressure, and the temperature was increased to 110° C. to remove the water in the reaction system completely. Excess epichlorohydrin was distilled away under atmospheric pressure, and further, distillation was carried out under reduced pressure of 20 hPa at 140° C.

To the obtained mixture of resin and sodium chloride were added 300 g of methyl isobutyl ketone and 36 g of an aqueous solution of sodium hydroxide of 10% by mass, and a reaction was carried out for 1.5 hours at 85° C. After the reaction was over, 750 g of methyl isobutyl ketone and 300 g of water were added, then the lower layer of aqueous solution of sodium chloride was removed by separation. Next, the layer of methyl isobutyl ketone was washed with 150 g of water and neutralized with phosphoric acid, and the water layer was removed. Further, 800 g of water was added for washing, and the water layer was removed. The separation of oil layer and water layer was satisfactory, and inorganic salts were recovered quantitatively. The layer of methyl isobutyl ketone was distilled under atmospheric pressure, then vacuum distillation was carried out successively under the pressure of 6.7 hPa at 140° C. to obtain 220 g of epoxy resin. Th epoxy equivalent of the epoxy resin was 258. The content of monofunctional compounds measured with GPC was 0.1% by mass or less.

Further, as the result of measuring the absorbance of a 2% dioxane solution of the resin, the absorbance at wavelength 350 nm was 1.691, and the Gardner color number was 18 or more.

TABLE 1

Properties of Resin

| | Cont. of Ether-type Product (molar fract.) | Softening Point (° C.) | Hydroxyl or Epoxy Equivalent[1] (g/eq) | O/P Ratio (molar ratio) | Absorbance [350 nm] | Gardner Color Number |
|---|---|---|---|---|---|---|
| Hydrocarbon-Phenol Resin | | | | | | |
| Example 1 | 0.43 | 96.0 | 170 | 2.7 | 0.983 | 14–15 |
| Example 3 | 0.31 | 90.0 | 169 | 2.6 | 0.851 | 13–14 |
| C. Ex.[*] 1 | 0.03 | 87.0 | 178 | 1.3 | 1.873 | 18 or more |
| C. Ex. 3 | 0.04 | 96.0 | 169 | 1.3 | 1.648 | 18 or more |
| Epoxy Resin | | | | | | |
| Example 2 | — | — | 261 | — | 0.741 | 14–15 |
| Example 4 | — | — | 256 | — | 0.710 | 11–12 |
| C. Ex. 2 | — | — | 280 | — | 1.793 | 18 or more |
| C. Ex. 4 | — | — | 258 | — | 1.691 | 18 or more |

Note [1]Hydroxyl Equivalent for Hydrocarbon-Phenol Resin, Epoxy Equivalent for Epoxy Resin
[*]C. Ex.: Comparative Example

INDUSTRIAL APPLICABILITY

According to the present invention, the intended product can be obtained in a short time because of its high efficiency in reaction. Further, the obtained hydrocarbon-phenol resin has an excellent color tone in addition to moisture resistance, thermal resistance and crack resistance similar to those of current resins. Therefore, the molded products are also excellent in external appearance and marking property.

Furthermore, the epoxy resin, which is obtained by adding glycidyl group to the hydrocarbon-phenol resin obtained by the above method, is excellent in moisture resistance and electrical property. Therefore, the cured material obtained by the use of epoxy resin is also excellent in moisture resistance, and so it is useful as resins for semiconductor, laminates for substrate of printed wiring, powder paint, brake shoe and so forth. Further, it is also excellent in external appearance after molding and marking property because of its excellence in color tone.

The invention claimed is:

1. A process for producing a hydrocarbon-phenol resin, comprising:
    (1) reacting a phenolic compound and dicyclopentadiene in the presence of an acid catalyst at a temperature in the range of 50° C. to 90° C. or, if the melting point of the phenolic compound is higher than 50° C., in the range from the melting point of the phenolic compound to 90° C.,
    wherein the concentration of the acid catalyst is from 0.001 to 10% by mass relative to the total mass of phenolic compound, dicyclopentadiene, and acid catalyst, the concentration of moisture is maintained at 200 ppm or less, and the dicyclopentadiene is added to the phenolic compound intermittently or continuously so that the molar fraction of the amount of ether product relative to that of the mixture of products is 0.1 or more; and
    (2) after addition of the dicyclopentadiene, increasing the temperature to 110° C. or higher so as to continue the reaction further and substantially extinguish the ether product.

2. A process for producing hydrocarbon-phenol resin as claimed in claim 1, wherein the ratio of ortho/para is 2.0 or more with regard to the substitution position of the unsaturated cyclic hydrocarbon relative to a hydroxyl group of the phenolic compound in said hydrocarbon-phenol resin.

3. A process for producing epoxy resin, which comprises the steps of reacting the hydrocarbon-phenol resin obtained by the process as claimed in claim 1, with epihalohydrin in the presence of a base catalyst, then removing residual catalyst, and removing unreacted epihalohydrin.

4. A process for producing hydrocarbon-phenol resin as claimed in claim 1, wherein after said reaction, catalyst is deactivated and then unreacted phenolic compound is recovered.

5. A process for producing hydrocarbon-phenol resin as claimed in claim 1, wherein said phenolic compound is phenol.

6. A process for producing a hydrocarbon-phenol resin as claimed in claim 1, wherein the concentration of the acid catalyst is from 0.05 to 1% by mass relative to the total mass of phenolic compound, dicyclopentadiene, and acid catalyst.

7. A process for producing a hydrocarbon-phenol resin as claimed in claim 1, wherein the moisture content is maintained at 100 ppm or less.

8. A process for producing a hydrocarbon-phenol resin as claimed in claim 1, wherein the reacting is carried out in a reaction vessel containing an inert gas.

9. A process for producing a hydrocarbon-phenol resin as claimed in claim 1, further comprising supplying the phenol compound and an organic solvent to a reaction vessel and heating the vessel to remove the organic solvent and moisture as an azeotropic mixture prior to adding the dicyclopentadiene.

10. A process for producing a hydrocarbon-phenol resin as claimed in claim 1, wherein the molar fraction of ether product relative to that of the mixture of products is 0.1 to 0.5.

11. A process for producing a hydrocarbon-phenol resin as claimed in claim 1, wherein said increasing the temperature reduces the molar fraction of ether product to 0.05 or less.

12. A process for producing a hydrocarbon-phenol resin as claimed in claim 1, wherein the content of the ether product is measured after addition of the dicyclopentadiene to the phenolic compound.

13. A process as claimed in claim 1, comprising using the molar fraction of the amount of ether product relative to that of the mixture of products as an index to adjust reaction temperature, retention time of reaction, catalyst concentration, or moisture content, depending upon the phenolic compound and dicyclopentadiene starting materials.

14. A process for producing a hydrocarbon-phenol resin as claimed in claim 1, wherein said increasing the temperature reduces the molar fraction of ether product to 0.02 or less.

15. A process as claimed in claim 1, wherein the molar ratio of phenolic compound to catalyst is 562 to 790:1.

16. A process for producing a hydrocarbon-phenol resin, comprising:
    reacting a phenolic compound and an unsaturated cyclic hydrocarbon having two or more carbon—carbon double bonds in the presence of an acid catalyst so that the molar fraction of the amount of ether product relative to that of the mixture of products is 0.1 or more; and increasing the temperature of reaction of the phenolic compound and the unsaturated cyclic hydrocarbon by at least 20° C. to reduce said molar fraction to 0.05 or less.

17. A process as claimed in claim 16, wherein the content of the ether product is measured after addition of said unsaturated cyclic hydrocarbon to said phenolic compound.

18. A process as claimed in claim 16, comprising using the molar fraction of the amount of ether product relative to that of the mixture of products as an index to adjust reaction temperature, retention time of reaction, catalyst concentration, or moisture content, depending upon the phenolic compound and dicyclopentadiene starting materials.

19. A process for producing a hydrocarbon-phenol resin as claimed in claim 16, wherein said increasing the temperature reduces the molar fraction of ether product to 0.02 or less.

20. A process as claimed in claim 16, wherein the molar ratio of phenolic compound to catalyst is 562 to 790:1.

* * * * *